Patented June 13, 1944

UNITED STATES PATENT OFFICE 2,351,366

PROCESS OF PREPARING ACETOACETIC ESTERS

Franz Josef Pohl, Hofheim, and Walter Schmidt, Frankfort - on - the - Main-Hochst, Germany; vested in the Alien Property Custodian No Drawing. Application June 15, 1940, Serial No. 340,838. In Germany July 3, 1939

8 Claims. (Cl. 260—483)

The present invention relates to a process of preparing acetoacetic esters.

Various processes are already known for causing aliphatic and cyclic compounds containing hydroxy groups to react with diketene so as to obtain acetoacetic esters by using as an esterification catalyst for instance hydrogen chloride, sulfuric acid or sodium bisulfate or metallic sodium. The reaction of organic compounds containing sulfur, such as mercaptans or thiophenols, with diketene so as to obtain thioacetoacetic esters has, however, not yet been described.

Now we have found that, in general, organic compounds with groups capable of being esterified, for instance alcohols, phenols, mercaptans or thiophenols, may be added on diketene so that acetoacetic esters or thio-acetoacetic esters are formed by performing the reaction in the presence of organic bases with tertiary nitrogen atom or of salts having an alkaline reaction in aqueous solution. The compounds named are capable of activating the diketene in such a manner that it polymerises in case no other reactive compounds are present, but that in the presence of compounds capable of being esterified it is added on said compounds with formation of acetoacetic esters.

There may be used for instance trimethyl-amine, triethyl-amine, tripropyl-amine, tributyl-amine, dimethyl-ethyl-amine, triethanol-amine, piperidine, picoline ethanol-piperidine, potassium-, lithium- and sodium-acetate, secondary and tertiary potassium- and sodium-phosphate, potassium- and sodium-silicate, potassium- and sodium-sulfite, borax, potassium- and sodium-stearate or the like. All these catalysts may be used in a proportion of about 0.01 per cent up to about 1 per cent calculated upon the diketene. A larger quantity has no detrimental action but in general it is useless.

It may be advisable to add, besides the substances named, also a small quantity, for instance one tenth to one half of the catalyst, of organic acids, particularly aliphatic carboxylic acids, such as acetic acid, propionic acid, butyric acid, or the like, for preventing the formation of by-products by the polymerization of the diketene. In the reactions described these acids, if applied alone, are entirely ineffective as a catalyst. The most favorable ratio between catalyst and acid may empirically be found out in an easy way and lies for instance in the case of sodium acetate and acetic acid at about 1:7 and in the case of borax and propionic acid at about 1:3.

Diketene and the compound capable of being esterified are in general applied in about equimolecular proportions. The reaction is strongly exothermic. By suitably cooling it is possible to keep the temperatures setting in so low that the addition product is not injured. The reaction may be performed without any difficulty in a continuous manner.

As starting materials there may, for instance, be used methyl-alcohol, ethyl-alcohol, propyl-alcohol or isopropylalcohol, the isomeric butyl- and amyl-alcohols, oleyl-alcohol, glycols, such as 1,3-butylene-glycol, phenol, the cresols and xylenoles, thiophenol, the thiocresols and methyl-, ethyl-, propyl- and butyl-mercaptan.

In comparison with the known processes likewise operating with application of diketene, the process herein described has the advantage that it is not necessary to eliminate the basic compound acting as a catalyst from the mixture after the reaction has taken place, whereas the hitherto used catalysts had always carefully to be removed in order to avoid during a further treatment by distillation a saponification or decomposition of the acetoacetic ester formed. Moreover, strong discolorations readily occur in the known processes; owing to said discolorations it is hardly possible, particularly if sensitive and not distillable acetoacetic esters are concerned, to use them for industrial purposes. The esters obtained according to the present invention may, however, be used for most of the industrial purposes, since the reaction may be carried through already at so low a temperature that careful reaction conditions are given. Finally very good yields are obtained according to the present process; they exceed the hitherto known yields and it is not necessary to apply a hitherto usual excess of for instance alcohol.

The following examples serve to illustrate the invention, but they are not intended to limit it thereto, the parts being by weight:

1. Into a solution preheated to 60° C. of 0.6 part of triethyl-amine in 160 parts of methyl alcohol there are introduced, drop by drop, while stirring, 420 parts of diketene with such a speed that the temperature during the reaction may be kept by an occasional cooling at 60° C.–70° C. After the entire quantity of diketene has been introduced stirring of the mixture is continued until the reaction is complete and the mixture is then subjected to a fractional distillation under a reduced pressure of 20 mm. The acetoacetic acid methyl ester distilling at 70° C.–73° C. under a pressure of 19–21 mm. is obtained in a yield of about 95 per cent of the theoretical yield.

2. From 828 parts of absolute ethyl alcohol and 1512 parts of diketene there are obtained, in the presence of 1.2 parts of triethyl-amine, in operating in a manner analogous to that of Example 1, 95 per cent of the theoretical yield of acetoacetic acid ethyl ester.

3. 230 parts of the absolute ethyl alcohol are caused to react, as described in Example 1, with 420 parts of diketene in the presence of 1.3 parts of dehydrated sodium acetate so as to obtain acetoacetic acid ethyl ester. The yield amounts to about 85 per cent of the theoretical yield.

If the reaction is performed in the presence of 9.1 parts of glacial acetic acid or propionic acid, the yield increases to 90 per cent of the theoretical yield.

4. 500 parts of crude diketene, containing 428 parts of pure diketene, 43.5 parts of acetic anhydride and 28.5 parts of higher ketene polymers, are mixed with 1.3 parts of dehydrated sodium acetate and the mixture is caused to react, as described in Example 1, with 254 parts of absolute ethyl alcohol (calculated upon the pure diketene+acetic anhydride). An addition of acetic acid is not necessary since acetic acid is inevitably produced by the reaction of the anhydride with the alcohol. About 90–95 per cent of acetoacetic ester calculated upon the pure diketene are obtained.

5. 240 parts of ordinary ethyl alcohol containing about 4 per cent of water, 420 parts of diketene, 1.3 parts of sodium acetate and 9.1 parts of glacial acetic acid are caused to react in a manner analogous to that of Example 1. The yield of acetoacetic ester amounts to about 85 per cent of the theoretical yield.

6. 46 parts of absolute alcohol are condensed as described in the preceding examples with 84 parts of diketene in the presence of 0.25 part of secondary sodium phosphate, while adding 1.25 parts of acetic acid. Instead of secondary sodium phosphate there may be used, as a catalyst, borax or another salt named in the specification. The yields of acetoacetic ester are between 80 and 90 per cent of the theoretical yield.

7. 84 parts of diketene are dissolved in 74 parts of n-butyl alcohol and there are added to the solution at room temperature, while stirring, first 1.5 parts of glacial acetic acid and then 0.3 part of pyridine. The reaction sets in at once with a strong evolution of heat and is terminated after a few minutes. The temperature may rise up to the boiling point of the ester formed. By a distillation of the mixture under reduced pressure there are obtained 85 per cent of the theoretical yield of acetoacetic acid-butyl ester boiling at 79° C.–80° C. under a pressure of 10 mm.

8. 74 parts of anhydrous, tertiary butyl alcohol are condensed, as described in Example 7, with 84 parts of diketene in the presence of 0.3 part of triethyl-amine so as to obtain acetoacetic acid ester of the tertiary butyl alcohol. The ester boils at 55° C.–57° C. under a pressure of 3.5 mm. and is obtained in a yield of 85 to 90 per cent of the theoretical yield.

9. 137 parts of commercial oleyl alcohol (6.2 per cent of OH) are caused to react, in a manner analogous to that described in Example 1, at 100° C. with 42 parts of diketene in the presence of 0.2 part of triethyl-amine. The ester formed is distilled under a reduced pressure of 4 mm. The ester boils at 185° C.–220° C. with a slight decomposition. The yield amounts to about 85 per cent of the theoretical yield.

10. 45 parts of 1.3-butyleneglycol are condensed, as it is described in Example 1, with 84 parts of diketene under the action of 0.26 part of sodium acetate, while adding 1.82 parts of glacial acetic acid. During the condensation both OH-groups are esterified. The feebly yellow mixture is washed with water and then dried under reduced pressure. The ester is not distillable; the yield of crude ester amounts to 80–85 per cent of the theoretical yield.

11. 47 parts of phenol, 42 parts of diketene and 0.1 part of sodium acetate are caused to react at 75° C.–80° C., as it is described in the preceding examples. The acetoacetic acid phenyl ester is obtained in a good yield and boils at 130° C.–142° C. under a pressure of 7 mm.

12. 43 parts of thiophenol are condensed, as it is described in Example 1, at about 55° C. with 33 parts of diketene in the presence of 0.08 part of triethylamine so as to obtain the acetoacetic acid ester of thiophenol. The crude ester of a feebly yellow coloration is not distillable and for eliminating the triethyl-amine, the ester is heated for a short time under a reduced pressure of 3 mm. to 50° C.–60° C. There are obtained 74.8 parts of crude ester which is nearly pure as has been ascertained by analysis.

13. 65.5 parts of ethyl-mercaptan, 88 parts of diketene and 0.3 part of triethyl-amine are caused to react in a manner analogous to that described in Example 12. At the beginning of the operation the temperature is kept, by cooling, at about 30° C.; pari passu with the progressing reaction it is, however, gradually raised to about 60° C. Contrary to the acetoacetic acid ester of thiophenol, the acetoacetic acid ester of ethyl-mercaptan obtained in a good yield is distillable, though with a slight decomposition; it boils at 66° C.–73° C. under a pressure of 2–3 mm.

We claim:

1. The process which comprises causing diketene to act upon a compound of the group consisting of alcohols, phenols, alkyl mercaptans and thiophenols in the presence of a catalyst of the group consisting of tertiary nitrogen bases and salts having an alkaline reaction in aqueous solution.

2. The process which comprises causing diketene to act upon a compound of the group consisting of alcohols, phenols, alkyl mercaptans and thiophenols in the presence of a catalyst of the group consisting of tertiary nitrogen bases and salts having an alkaline reaction in aqueous solution and in the presence of a small amount of an organic acid.

3. The process which comprises causing diketene to act upon a compound of the group consisting of alcohols, phenols, alkyl mercaptans and thiophenols in the presence of a catalyst of the group consisting of tertiary nitrogen bases and salts having an alkaline reaction in aqueous solution and in the presence of a small amount of an aliphatic carboxylic acid.

4. The process which comprises causing diketene to act upon a compound of the group consisting of alcohols, phenols, alkyl mercaptans and thiophenols in the presence of an aliphatic tertiary amine as a catalyst.

5. The process which comprises causing diketene to act upon a compound of the group consisting of alcohols, phenols, alkyl mercaptans and thiophenols in the presence of an aliphatic tertiary amine as a catalyst and of a small amount of an aliphatic carboxylic acid.

6. The process which comprises causing diketene to act upon methyl alcohol in the presence of triethyl-amine as a catalyst.

7. The process which comprises causing diketene to act upon ethyl alcohol in the presence of triethyl-amine as a catalyst.

8. The process which comprises causing diketene to act upon oleyl alcohol in the presence of triethyl-amine as a catalyst.

FRANZ JOSEF POHL.
WALTER SCHMIDT.